(12) United States Patent
Miyoshi et al.

(10) Patent No.: US 7,344,683 B2
(45) Date of Patent: Mar. 18, 2008

(54) EXHAUST GAS CATALYTIC CONVERTER

(75) Inventors: Seiji Miyoshi, Hiroshima (JP); Hiroshi Yamada, Hiroshima (JP); Akihide Takami, Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 11/368,674

(22) Filed: Mar. 7, 2006

(65) Prior Publication Data
US 2006/0233678 A1 Oct. 19, 2006

(30) Foreign Application Priority Data
Apr. 14, 2005 (JP) ............... 2005-116627

(51) Int. Cl.
*B01J 2/10* (2006.01)
*B01D 50/00* (2006.01)

(52) U.S. Cl. ............ 422/172; 502/302; 502/304; 502/326; 502/339

(58) Field of Classification Search ........... 502/302, 502/304, 349, 326, 327, 332–334, 339, 439, 502/415, 527.12; 422/172
See application file for complete search history.

(56) References Cited

U.S. PATENT DOCUMENTS

| 5,597,771 A * | 1/1997 | Hu et al. ............ 502/304 |
| 5,866,078 A | 2/1999 | Pfefferle |
| 5,989,507 A * | 11/1999 | Sung et al. .......... 423/213.5 |
| 5,993,762 A | 11/1999 | Rajaram et al. |
| 6,087,298 A * | 7/2000 | Sung et al. ........... 502/333 |
| 6,953,769 B2 * | 10/2005 | Yamada et al. ........... 502/302 |
| 2003/0039597 A1 * | 2/2003 | Deeba et al. ............ 422/177 |
| 2003/0083193 A1 | 5/2003 | Takaya et al. |
| 2004/0001782 A1 * | 1/2004 | Kumar et al. ........... 422/180 |
| 2005/0031501 A1 | 2/2005 | Kawai et al. |
| 2005/0084427 A1 | 4/2005 | Kikuchi et al. |
| 2005/0119120 A1 | 6/2005 | Iwakuni et al. |

FOREIGN PATENT DOCUMENTS

| EP | 0 602 865 A1 | 6/1994 |
| EP | 1 598 104 A1 | 11/2005 |
| JP | 06-246155 | 9/1994 |

(Continued)

OTHER PUBLICATIONS

Partial European Search report dated Aug. 3, 2006 Application No. EP 06 00 6448.

*Primary Examiner*—Cam N. Nguyen
(74) *Attorney, Agent, or Firm*—Nixon Peabody LLP; Donald R. Studebaker

(57) ABSTRACT

The present invention is intended to ensure the improvement in catalytic performance of an exhaust gas catalytic converter, which is an essential performance thereof, ensure the thermal resistance thereof and downsize the converter, i.e., improve the arrangeability thereof. The exhaust gas catalytic converter has an upstream catalyst and a downstream catalyst which are arranged in upstream and downstream sides of an engine exhaust passage through which exhaust gas flows. Each of the upstream catalyst and the downstream catalyst contains an oxygen storage component. The oxygen storage component in the upstream catalyst has a structure in which Rh atoms are placed at or between crystal lattice points of a mixed oxide containing Ce and Zr and has a larger amount of oxygen storage than the oxygen storage component in the downstream catalyst under the same temperature conditions.

6 Claims, 4 Drawing Sheets

FOREIGN PATENT DOCUMENTS

| | | |
|---|---|---|
| JP | 2000-300989 | 10/2000 |
| JP | 2003-246624 | 9/2003 |
| JP | 2004-068717 | 3/2004 |
| JP | 2004-074138 | 3/2004 |
| JP | 2004-122122 | 4/2004 |
| JP | 2004-174490 | 6/2004 |
| JP | 2004-267843 | 9/2004 |
| JP | 2004-283692 | 10/2004 |
| JP | 2005-028334 | 3/2005 |
| JP | 2005-161143 | 6/2005 |

* cited by examiner

EXHAUST GAS CATALYTIC CONVERTER

CROSS-REFERENCES TO RELATED APPLICATIONS

This application claims priority under 35 USC 119 to Japanese Patent Application No. 2005-116627, the entire contents of which are incorporated herein by reference.

BACKGROUND OF THE INVENTION (a) Field of the Invention

This invention relates to exhaust gas catalytic converters useful for purifying exhaust gas from automobile engines.

(b) Description of the Related Art

Many of recent automobile exhaust gas purification techniques use a close-coupled catalyst (manifold catalyst) directly coupled to an exhaust manifold for early catalytic activation after engine start, in combination with one or more underfloor catalysts disposed under the vehicle floor to convert part of exhaust gas which the close-coupled catalyst has failed to convert. Such underfloor catalysts are also disposed as close to the engine as possible for their early catalytic activation. Therefore, the underfloor catalysts have a problem that catalytic precious metal particles are sintered by the heat of the exhaust gas, like the close-coupled catalyst.

Inventors have proposed, as a solution to the above problem, an exhaust gas purification catalyst disclosed in Japanese Unexamined Patent Publication No. 2004-174490. In the catalyst, catalytic precious metal atoms are placed at crystal lattice points of a Ce—Zr-based mixed oxide which is an oxygen storage component or placed between atoms (crystal lattice points) of the mixed oxide, thereby enhancing the oxygen storage capacity of the oxygen storage component and preventing sintering of the catalytic precious metal.

The air-fuel ratio of the engine always varies. Three-way catalysts are required to absorb variations in the air-fuel ratio to provide ensured exhaust gas purification. The above patent document also discloses that since the oxygen storage component has a high rate of oxygen storage, it exhibits a high response of oxygen storage and release to variations in the air-fuel ratio, thereby enhancing the exhaust gas conversion efficiency.

To satisfy not only the requirement for provision of the response of the catalyst to variations in the air-fuel ratio but also the requirement for provision of the thermal resistance of the catalyst, conventional approaches have been directed to increasing the amount of catalyst disposed in the exhaust passage of the engine or increasing the capacity of the catalyst. However, the recent trend of motor vehicles is toward extending the passengers room while reducing the engine room for improvement in comfortableness to ride in the vehicle and engines are recently upsizing. Therefore, the close-coupled catalyst is required to enhance the arrangeability in the engine room (reduce the size). The underfloor catalyst is likewise required to enhance the arrangeability in consideration of the relations with members arranged under the vehicle floor, such as a propeller shaft and a suspension cross member.

SUMMARY OF THE INVENTION

With the foregoing in mind, an object of the present invention is to ensure the improvement in catalytic performance of an exhaust gas catalytic converter, which is an essential performance thereof, ensure the thermal resistance thereof and downsize the converter, i.e., improve the arrangeability thereof.

To attain the above object, in the present invention, an upstream catalyst and a downstream catalyst, each acting as a three-way catalyst, are arranged in an exhaust passage of an engine and an oxygen storage component in the upstream catalyst is doped with Rh, more specifically, Rh atoms are placed at or between crystal lattice points of a mixed oxide which is the oxygen storage component, thereby improving the thermal resistance, exhaust gas purification performance and oxygen storage capacity of the upstream catalyst. More specific solutions are described below.

A first solution of the present invention is directed to an exhaust gas catalytic converter having an upstream catalyst and a downstream catalyst which are arranged in upstream and downstream sides of an engine exhaust passage through which exhaust gas flows, wherein each of the upstream catalyst and the downstream catalyst contains an oxygen storage component, and the oxygen storage component in the upstream catalyst has a structure in which Rh atoms are placed at or between crystal lattice points of a mixed oxide containing Ce and Zr and has a larger amount of oxygen storage than the oxygen storage component in the downstream catalyst under the same temperature conditions.

In the first solution, since the oxygen storage component in the upstream catalyst has a larger amount of oxygen storage than that in the downstream catalyst under the same temperature conditions, this is advantageous in absorbing/releasing oxygen from/to exhaust gas without shortage according to variations in the engine air-fuel ratio, even variations with a large amplitude (for example, even if the air-fuel ratio varies with an amplitude of ±0.9 or more with respect to the stoichiometric air-fuel ratio of 14.7).

Therefore, the upstream catalyst is restrained from being reduced in exhaust gas conversion efficiency owing to variations in the air-fuel ratio. This makes it possible to avoid upsizing of the catalyst for ensuring exhaust gas purification performance, or is advantageous in downsizing the catalytic converter, which improves the arrangeability of the catalytic converter. Further, variations in the oxygen concentration of exhaust gas can be absorbed by oxygen storage/release in the upstream catalyst even if the air-fuel ratio varies with such a large amplitude as described above. Therefore, the downstream catalyst can efficiently convert exhaust gas in spite that its oxygen storage component has a relatively small amount of oxygen storage. This is advantageous in downsizing the catalytic converter or improving the arrangeability of the catalytic converter, like the upstream catalyst.

Furthermore, Rh in the oxygen storage component in the upstream catalyst not only acts to increase the amount of oxygen storage but also act as a catalytic precious metal to convert HC (hydrocarbon), CO (carbon monoxide) and NOx (nitrogen oxides). In addition, Rh atoms are placed at or between crystal lattice points of the mixed oxide to strongly bind to the mixed oxide. Therefore, Rh particles are restrained from being sintered by the heat of exhaust gas, prevents the structure of the mixed oxide itself from being broken down by the heat of exhaust gas and in turn prevents the mixed oxide from deteriorating the oxygen storage capacity.

The upstream catalyst may be a close-coupled catalyst disposed in an automobile engine room or an underfloor catalyst. In the former case, an underfloor catalyst can be used as the downstream catalyst. In the latter case, the downstream catalyst can be an underfloor catalyst disposed downstream of the underfloor catalyst disposed in the upstream side of the exhaust gas flow. This is valid for the following other solutions of the invention.

The above first solution does not limit the oxygen storage component for use in the downstream catalyst to one having a structure in which Rh atoms are placed at or between crystal lattice points of a mixed oxide containing Ce and Zr. So long as the oxygen storage component in the upstream catalyst has a larger amount of oxygen storage than the oxygen storage component in the downstream catalyst, any types of oxygen storage components can be used in the downstream catalyst.

A second solution of the invention is characterized in that in the first solution, the oxygen storage component in the downstream catalyst has a structure in which Rh atoms are placed at or between crystal lattice points of a mixed oxide containing different ingredients from the oxygen storage component in the upstream catalyst, and the oxygen storage component in the upstream catalyst has a higher rate of oxygen storage than the oxygen storage component in the downstream catalyst under the same temperature conditions.

At high frequencies of variations in the engine air-fuel ratio (for example, 1 Hz or more), even if an oxygen storage component having a high amount of oxygen storage is employed in the upstream catalyst, oxygen storage/release may lag behind variations in the air-fuel ratio so that an expected exhaust gas purification cannot be attained. In the second solution, since the oxygen storage component in the upstream catalyst has a higher rate of oxygen storage than the oxygen storage component in the downstream catalyst, oxygen storage/release can take place with good response to variations in the air-fuel ratio, thereby enhancing the exhaust gas purification performance.

A third solution of the invention is characterized in that in the second solution, the oxygen storage component in the upstream catalyst has a structure in which Rh atoms are placed at or between crystal lattice points of a Ce—Zr—Nd ternary oxide, and the oxygen storage component in the downstream catalyst has a structure in which Rh atoms are placed at or between crystal lattice points of a Ce—Zr binary oxide.

As will be obvious from the later-described experimental data, the oxygen storage component in which Rh atoms are placed at or between crystal lattice points of a Ce—Zr—Nd ternary oxide has a higher rate of oxygen storage than the oxygen storage component in which Rh atoms are placed at or between crystal lattice points of a Ce—Zr binary oxide. Therefore, the third solution can increase the rate of oxygen storage of the oxygen storage component in the upstream catalyst to ensure the exhaust gas purification performance at high frequencies of variations in the air-fuel ratio.

A fourth solution of the invention is directed to an exhaust gas catalytic converter having an upstream catalyst and a downstream catalyst which are arranged in upstream and downstream sides of an engine exhaust passage through which exhaust gas flows, wherein the upstream catalyst comprises an inner catalytic layer disposed on a support and an outer catalytic layer disposed on the inner catalytic layer, and the outer catalytic layer contains an oxygen storage component in which Rh atoms are placed at or between crystal lattice points of a mixed oxide containing Ce, Zr and Nd.

In the fourth solution, since the oxygen storage component contained in the outer catalytic layer of the upstream catalyst has a structure in which Rh atoms are placed at or between crystal lattice points of a mixed oxide containing Ce, Zr and Nd, it has a large amount of oxygen storage and a high rate of oxygen storage. In the upstream catalyst, since such an oxygen storage component is contained in the outer catalytic layer directly exposed to exhaust gas, variations in the air-fuel ratio can be efficiently absorbed by the oxygen storage component. This makes it possible to avoid upsizing of the catalyst for ensuring exhaust gas purification performance, or is advantageous in downsizing the catalytic converter, which improves the arrangeability of the catalytic converter. Further, since variations in the oxygen concentration of exhaust gas can be absorbed by the upstream catalyst, the downstream catalyst can efficiently convert exhaust gas. This is advantageous in downsizing the catalytic converter or improving the arrangeability of the catalytic converter, like the upstream catalyst.

Furthermore, Rh in the oxygen storage component in the upstream catalyst not only acts to increase the amount of oxygen storage but also act as a catalytic precious metal to convert HC, CO and NOx. In addition, Rh atoms are placed at or between crystal lattice points of the mixed oxide to strongly bind to the mixed oxide. Therefore, Rh particles are restrained from being sintered by the heat of exhaust gas, prevents the structure of the mixed oxide itself from being broken down by the heat of exhaust gas and in turn prevents the mixed oxide from deteriorating the oxygen storage capacity.

A fifth solution of the invention is characterized in that in the fourth solution, the downstream catalyst contains at least one of an oxygen storage component in which Rh atoms are placed at or between crystal lattice points of a mixed oxide containing Ce and Zr and an oxygen storage component in which Rh particles are carried on a mixed oxide containing Ce and Zr.

In the fifth solution, variations in the air-fuel ratio can also be absorbed by the oxygen storage component in the downstream catalyst. In addition, Rh is contained in the oxygen storage component. Therefore, this solution is further advantageous in efficiently converting exhaust gas.

A sixth solution of the invention is characterized in that in the fourth or fifth solution, the inner and outer catalytic layers of the upstream catalyst contain Pd and Pt, respectively.

In the sixth solution, Pd in the inner catalytic layer and Pt in the outer catalytic layer are restrained from being sintered and alloyed with each other. Further, since Pd is protected by the outer catalytic layer, it can be restrained from being poisoned with S (sulfur) and P (phosphor).

DETAILED DESCRIPTION OF THE INVENTION

An embodiment of the present invention will be described in details below with reference to the drawings.

Figure 1:
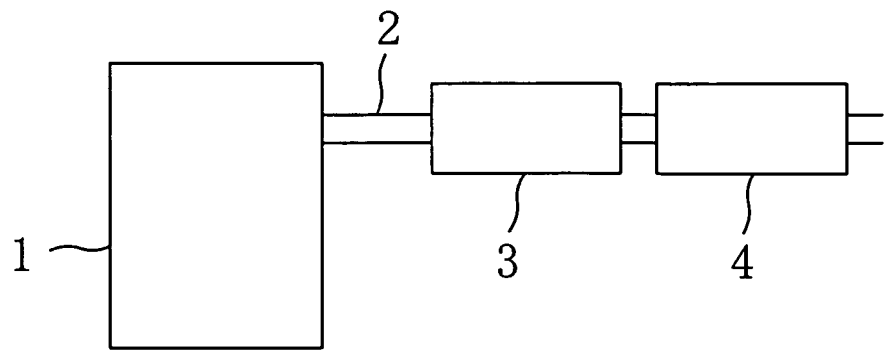
FIG. 1 is a diagram showing the structure of an exhaust gas catalytic converter.

In FIG. 1, the reference numeral 1 denotes an automobile engine, the reference numeral 2 denotes an exhaust passage of the engine, the reference numeral 3 denotes an upstream catalyst (three-way catalyst) arranged in an upstream side of the exhaust passage 2 through which exhaust gas flows, and the reference numeral 4 denotes a downstream catalyst (three-way catalyst) arranged in a downstream side of the exhaust passage 2.

<Preparation of Catalysts A to C>

Figure 2:
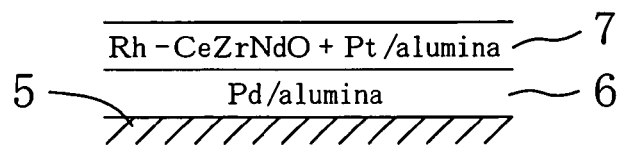
FIG. 2 is a diagram showing the structure of a catalyst A.
Figure 3:
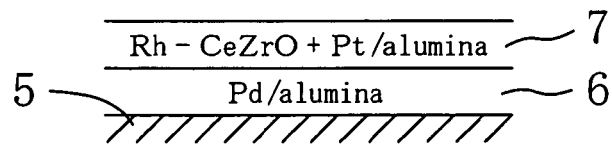
FIG. 3 is a diagram showing the structure of a catalyst B.
Figure 4:
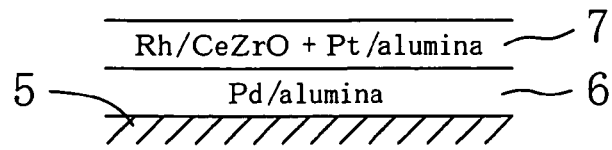
FIG. 4 is a diagram showing the structure of a catalyst C.

In order to construct each of catalytic converters of Examples and Comparative Example using the catalyst arrangement shown in FIG. 1, three types of catalysts A, B and C shown in FIGS. 2, 3 and 4, respectively, were prepared. The three types of catalysts were each formed by stacking an inner catalytic layer 6 and an outer catalytic layer 7 on the wall 5 of each of cells forming a honeycomb support (hereinafter, simply referred to as a support) in an arrangement that the inner catalytic layer 6 is located near to the cell wall 5 and the outer catalytic layer 7 is directly exposed to exhaust gas.

Catalyst A

The inner catalytic layer 6 of the catalyst A shown in FIG. 2 contains Pd/alumina as a catalytic component. Pd/alumina was obtained by post-carrying Pd as a catalytic metal on powders of gamma-alumina containing 4 mass % of La. The process herein called "post-carrying" means carrying a catalytic metal on a support material such as gamma-alumina powder by bringing the support material into contact with a solution of the catalytic metal and then calcining it. Specifically, evaporation to dryness was employed as the post-carrying process in this embodiment.

The outer catalytic layer 7 of the catalyst A contains a mixture of Rh—CeZrNdO and Pt/alumina as a catalytic component. Rh—CeZrNdO has a structure in which Rh atoms are placed at or between crystal lattice points of a Ce—Zr—Nd ternary oxide. Pt/alumina was obtained by post-carrying Pt as a catalytic metal on gamma-alumina powders containing 4 mass % of La and prepared in the same manner as for Pd/alumina.

Preparation of Rh—CeZrNdO Catalytic Component

Rh—CeZrNdO was prepared by coprecipitation using as source materials respective solutions of Ce, Zr, Nd and Rh. The preparation method is described below. First, respective predetermined amounts of zirconium oxynitrate solution, cerous nitrate solution, neodymium (III) nitrate solution and rhodium nitrate solution are mixed with water to make a total volume of 300 mL of mixed solution, and the mixed solution is stirred at room temperature for about an hour. The mixed solution is heated to 80° C. and then mixed with 50 mL of 28% aqueous ammonia by adding the aqueous ammonia prepared in another beaker to the mixed solution at once while stirring strongly and rapidly with a glass bar. The adding and mixing is completed within one second. The white-turbid solution resulting from the mixture with aqueous ammonia is allowed to stand for a diel to produce a cake, and the cake is centrifuged and sufficiently rinsed in water. The water-rinsed cake is dried at approximately 150° C., and then calcined under the condition of keeping it at 400° C. for five hours and then keeping it at 500° C. for two hours, thereby obtaining a Rh—CeZrNdO mixed oxide.

The resultant Rh—CeZrNdO mixed oxide is produced by coprecipitation by doping the mixed oxide with Rh as a precious metal component. Therefore, Rh atoms are placed at crystal lattice points of the mixed oxide like Ce and Zr atoms and, in other words, Rh atoms are strongly bound to the mixed oxide. Alternatively, Rh atoms are placed between crystal lattice points of the mixed oxide. In either case, Rh atoms are evenly dispersed on and in each crystallite of the mixed oxide.

Coating of Catalytic Component

In the formation of the inner catalytic layer 6, Pd/alumina and an alumina binder were weighed and mixed so that the amounts of them when carried on the support could reach predetermined amounts, respectively. Then, ion-exchange water was added to the mixture thereby preparing a slurry. The slurry was washcoated on the support by immersing the support in the slurry, picking it up from the slurry, and then blowing out an excess amount of slurry. Next, the washcoated support was dried at a temperature of 150° C. for an hour and then calcined at a temperature of 540° C. for two hours, thereby forming an inner catalytic layer 6.

In the formation of the outer catalytic layer 7, Rh—CeZrNdO, Pt/alumina and an alumina binder were weighed and mixed so that the amounts of them when carried on the support could reach predetermined amounts, respectively. Then, ion-exchange water was added to the mixture thereby preparing a slurry. The slurry was washcoated on the support on which the inner catalytic layer 6 was formed, and dried and calcined in the same manner as in the formation of the inner catalytic layer 6, thereby forming an outer catalytic layer 7.

Catalyst Capacity and Amount of Catalytic Component Carried on the Support

The capacity (support capacity) of the catalyst A is 0.9 L. The Pd/alumina and Pt/alumina were carried on the support so that gamma-alumina, Pd and Pt were at 50 g, 0.1 g and 0.1 g, respectively, per 1 L of the support. The Rh—CeZrNdO was carried on the support so that it was at 100 g per 1 L of the support. The mass ratio between oxides in the Rh—CeZrNdO mixed oxide was $CeO_2:ZrO_2:Nd_2O_3=22:68:10$. The amount of Rh in the mixed oxide was 0.116 mass %.

Catalyst B

For the catalyst B shown in FIG. 3, the inner catalytic layer 6 contains Pd/alumina as a catalytic component like the catalyst A, but the outer catalytic layer 7 contains a mixture of Rh—CeZrO and Pt/alumina. That is, the catalyst B is different from the catalyst A in that it employs Rh—CeZrO. Rh—CeZrO has a structure in which Rh atoms are placed at or between crystal lattice points of a Ce—Zr binary oxide and was prepared by coprecipitation like Rh—CeZrNdO of the catalyst A.

The inner and outer catalytic layers 6 and 7 were formed in the same manner as those of the catalyst A. The capacity of the catalyst B is 0.9 L. Out of the catalytic components in the catalyst B, the Pd/alumina and Pt/alumina were carried on the support so that gamma-alumina, Pd and Pt were at 50 g, 0.1 g and 0.1 g, respectively, per 1 L of the support like the catalyst A, and the Rh—CeZrO was carried on the support so that it was at 100 g per 1 L of the support. The mass ratio between oxides in the Rh—CeZrO mixed oxide was $CeO_2:ZrO_2=25:75$. The amount of Rh in the mixed oxide was 0.116 mass %.

Catalyst C

For the catalyst C shown in FIG. 4, the inner catalytic layer 6 contains Pd/alumina as a catalytic component like the catalyst A, but the outer catalytic layer 7 contains a mixture of Rh/CeZrO and Pt/alumina. That is, the catalyst C is different from the catalyst A in that it employs Rh/CeZrO. Rh/CeZrO was obtained by post-carrying Rh on a Ce—Zr binary oxide.

The inner and outer catalytic layers 6 and 7 were formed in the same manner as those of the catalyst A. The capacity of the catalyst C is 1.0 L. Out of the catalytic components in the catalyst C, the Pd/alumina and Pt/alumina were carried on the support so that gamma-alumina, Pd and Pt were at 50 g, 0.1 g and 0.1 g, respectively, per 1 L of the support like the catalyst A, and the Rh/CeZrO was carried on the support so that it was at 100 g per 1 L of the support. The mass ratio between oxides in the Rh/CeZrO mixed oxide was $CeO_2:ZrO_2=25:75$. The amount of Rh in the mixed oxide was 0.116 mass %.

<Oxygen Storage Capacity>

Each of the Rh—CeZrNdO, Rh—CeZrO and Rh/CeZrO in the catalysts A to C acts as an oxygen storage component. These oxygen storage components were measured in terms of the amount and rate of oxygen storage. The measurement methods will be described below.

Figure 5:
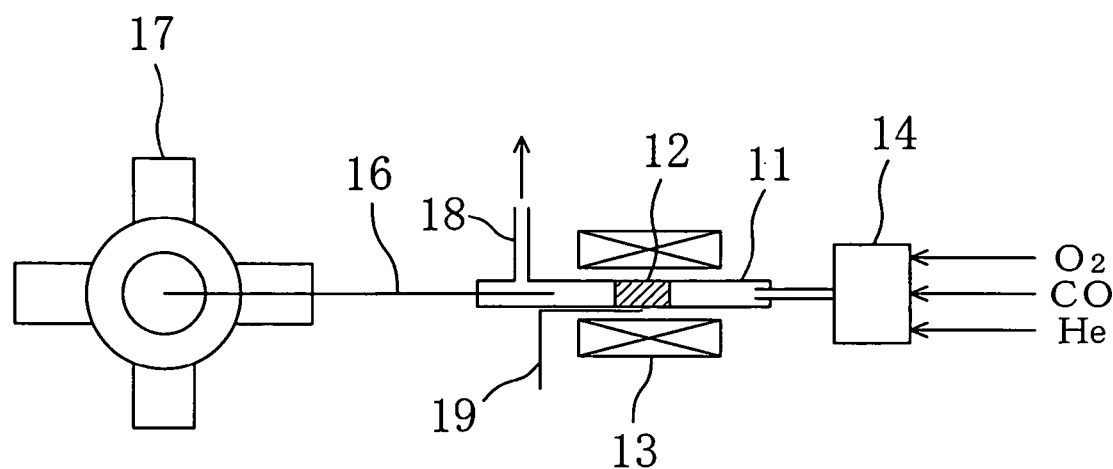
FIG. 5 is a schematic diagram showing a measurement device for measuring oxygen storage properties.

Each of the oxygen storage components was mixed with alumina and prepared into a granular sample. Each granular sample was aged (heated at 1000° C. under atmospheric conditions for 24 hours) and then measured in terms of the rate of oxygen storage under excess oxygen conditions. FIG. 5 shows a measurement device for the measurement. In this figure, the reference numeral 11 denotes a glass tube for holding a sample 12. The sample 12 is heated to and maintained at a predetermined temperature by a heater 13. The glass tube 11 is connected, upstream of the sample 12, with a pulsed gas generator 14 for supplying pulsed gases of $O_2$, CO and He individually. Downstream of the sample 12, the glass tube 11 is also connected with a mass spectrometer 17 through a capillary column 16 and provided with an exhaust part 18. A thermocouple 19 for temperature control is attached to the portion of the glass tube 11 in which a sample is to be held.

Figure 6:
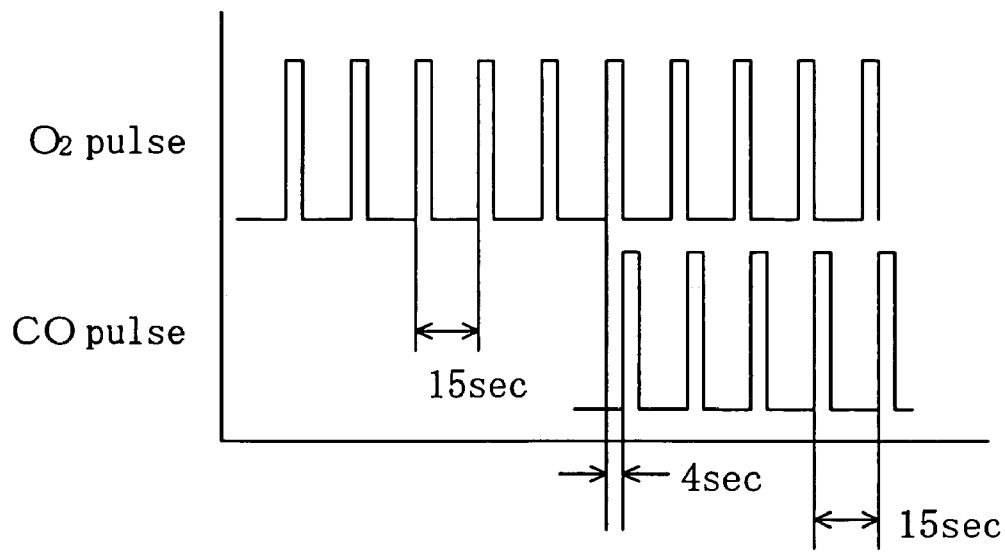
FIG. 6 is a time chart showing how the measurement device generates $O_2$ pulses and CO pulses.

In measurement, the sample temperature in the glass tube 11 was kept at the predetermined temperature. Under this condition, as shown in FIG. 6, a cycle of generation of an $O_2$ pulse (with a width of 25 ms) every 15 seconds was repeated several times and CO pulses (with a width of 50 ms) were then generated after four seconds delay from each of subsequent generations of $O_2$ pulses, while exhaust gas was constantly discharged from the exhaust part 18. During the time, the mass spectrometer 17 was used to measure the time variation of the signal intensity of mass number 32 (the amount of $O_2$) in each cycle.

Figure 7:
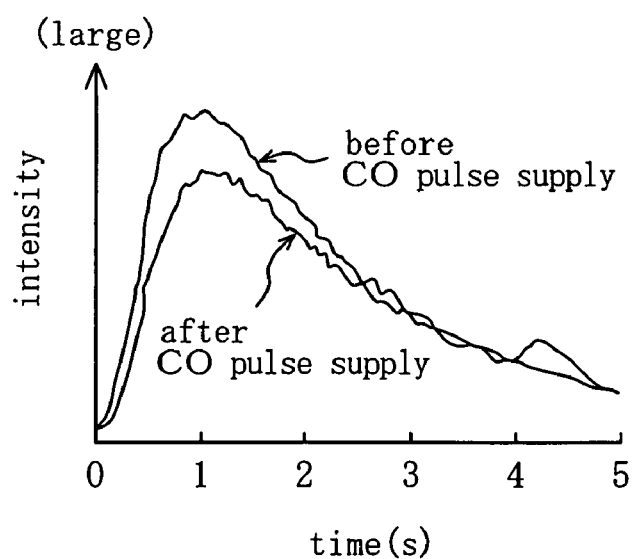
FIG. 7 is a graph showing the time variations of the signal intensity of mass number 32 measured by a mass spectrometer in the measurement device.

Thus, as shown in FIG. 7, determination was made of the time variation of the signal intensity of mass number 32 before supply of CO pulses (data when the change in the signal intensity became stable because of saturation of oxygen storage of the sample during the period of generation of $O_2$ pulses alone) and the time variation of the signal intensity of mass number 32 after supply of CO pulses (data when the change in the signal intensity became stable during the period of generation of CO pulses after generation of $O_2$ pulses alone). In this determination results, the reason for the difference between the signal intensities before and after supply of CO pulses is that the sample stored oxygen.

More specifically, the signal intensity before supply of CO pulses is based on the observation of the amount of oxygen having passed through the sample in which oxygen storage is saturated. Therefore, it almost exactly reflects the amount of oxygen supplied by $O_2$ pulses. On the other hand, after supply of CO pulses, supplied CO pulses allow $O_2$ to be released from inside the sample and thereby changed into $CO_2$, and in turn the corresponding amount of oxygen to the released oxygen is stored in the sample. Therefore, the signal intensity after supply of CO pulses reflects the amount of oxygen obtained by subtracting the amount of oxygen stored in the sample from the amount of oxygen supplied by $O_2$ pulses. Hence, the amount of oxygen stored (i.e., the amount of oxygen storage) can be obtained by subtracting the signal intensity after supply of CO pulses from the signal intensity before supply of CO pulses.

Figure 8:
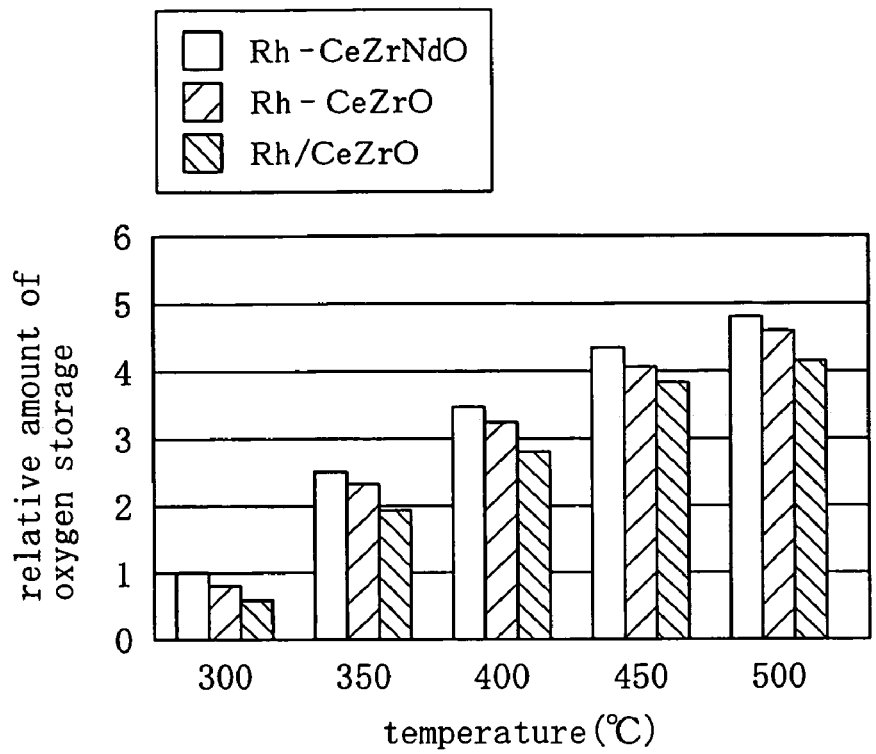
FIG. 8 is a graph for comparison among relative amounts of oxygen storage of three kinds of oxygen storage components.

FIG. 8 shows the relative amounts of oxygen storage of the above oxygen storage components at different measurement temperatures when the amount of oxygen storage of Rh—CeZrNdO at a measurement temperature of 300° C. is assumed as 1. At any of the measurement temperatures, Rh—CeZrNdO exhibited the largest amount of oxygen storage, Rh—CeZrO the second largest amount of oxygen storage, and Rh/CeZrO the smallest amount of oxygen storage.

Figure 9:
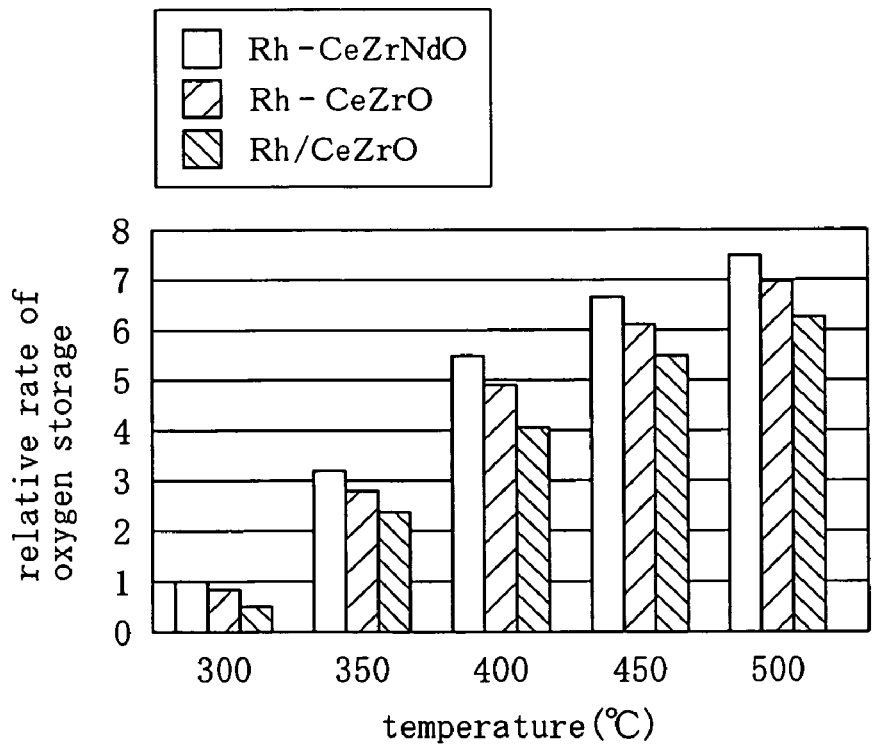
FIG. 9 is a graph for comparison among relative rates of oxygen storage of the three kinds of oxygen storage components.

FIG. 9 shows the relative rates of oxygen storage of the above oxygen storage components at different measurement temperatures when the rate of oxygen storage of Rh—CeZrNdO at a measurement temperature of 300° C. is assumed as 1. At any of the measurement temperatures, Rh—CeZrNdO exhibited the highest rate of oxygen storage, Rh—CeZrO the second highest rate of oxygen storage, and Rh/CeZrO the lowest rate of oxygen storage.

Structures of Catalytic Converters of Examples 1 and 2 and Comparative Example

In Example 1, the catalysts A and C were employed as the upstream and downstream catalysts 3 and 4, respectively. Therefore, the oxygen storage component (Rh—CeZrNdO) in the upstream catalyst 3 (i.e., the catalyst A) has a larger amount of oxygen storage and a higher rate of oxygen storage than the oxygen storage component (Rh/CeZrO) in the downstream catalyst 4 (i.e., the catalyst C). The total catalyst capacity of the upstream and downstream catalysts 3 and 4 in Example 1 is 1.9 L.

In Example 2, the catalysts A and B were employed as the upstream and downstream catalysts 3 and 4, respectively. Therefore, the oxygen storage component (Rh—CeZrNdO) in the upstream catalyst 3 (i.e., the catalyst A) has a larger amount of oxygen storage and a higher rate of oxygen storage than the oxygen storage component (Rh—CeZrO) in the downstream catalyst 4 (i.e., the catalyst B). The total catalyst capacity of the upstream and downstream catalysts 3 and 4 in Example 2 is 1.8 L.

In Comparative Example, the catalyst C was employed as each of the upstream and downstream catalysts 3 and 4. Therefore, the oxygen storage component in the upstream catalyst 3 is equal in the amount and rate of oxygen storage to the oxygen storage component in the downstream catalyst 4. The total catalyst capacity of the upstream and downstream catalysts 3 and 4 in Comparative Example is 2.0 L.

Evaluations of Catalytic Converters of Examples 1 and 2 and Comparative Example

The catalytic converters of Examples 1 and 2 and Comparative Example were measured in terms of light-off temperatures T50 and high-temperature catalytic conversion efficiencies C400 for conversion of HC, CO and NOx using a model gas flow reactor and an exhaust gas analyzer. Each of the catalysts A to C in Examples 1 and 2 and Comparative Example was previously aged by keeping it at 1000° C. under atmospheric conditions for 24 hours. The measurement of T50 and C400 for each catalytic converter was carried out after a model gas of rich A/F ratio (temperature: 600° C.) was allowed to flow through the catalytic converter for 10 minutes. T50 indicates the gas temperature at the entrance of each catalytic converter when the gas conversion efficiency reaches 50% after the temperature of the model gas flowing into the converter is gradually increased from normal temperature. C400 indicates the catalytic conversion efficiency when the gas temperature at the catalytic converter entrance is 400° C.

The model gas had an A/F ratio of 14.7±1.2. Specifically, a mainstream gas was allowed to flow constantly at an A/F ratio of 14.7 and a predetermined amount of gas for changing the A/F ratio was added in pulses, so that the A/F ratio was forcedly periodically varied with an amplitude of ±1.2. A frequency of variations of 1 Hz was used in Example 1, a frequency of variations of 2 Hz in Example 2, and two types of frequencies of variations of 1 Hz and 2 Hz in Comparative Example. The flow rate of the model gas was common to Examples 1 and 2 and Comparative Example. On the other hand, since Examples 1 and 2 and Comparative Example have different catalyst capacities, they had different space velocities SV. The space velocity SV in Example 1 was 63200 $h^{-1}$, the space velocity in Example 2 was 66700 $h^{-1}$, and the space velocity in Comparative Example was 60000 $h^{-1}$. The rate of temperature rise of the model gas was 30° C./min. The measurement results are shown in Table 1.

TABLE 1

| | Conditions | | | T50 (° C.) | | | C400 (%) | | |
| | Gas composition | Frequency | SV | HC | CO | NOx | HC | CO | NOx |
|---|---|---|---|---|---|---|---|---|---|
| Example 1 | A/F = 14.7 ± 1.2 | 1 Hz | 63200/h | 268 | 252 | 249 | 98 | 97 | 94 |
| Example 2 | A/F = 14.7 ± 1.2 | 2 Hz | 66700/h | 261 | 247 | 243 | 99 | 98 | 96 |
| Comparative Example | A/F = 14.7 ± 1.2 | 1 Hz | 60000/h | 275 | 260 | 256 | 93 | 91 | 80 |
| | A/F = 14.7 ± 1.2 | 2 Hz | 60000/h | 272 | 258 | 253 | 98 | 95 | 91 |

In comparison between Example 1 (frequency: 1 Hz) and Comparative Example (frequency: 1 Hz), Example 1 exhibited better results for both T50 and C400 than Comparative Example though the former has a higher space velocity than the latter. The reason is believed to be that Rh—CeZrNdO having a larger amount of oxygen storage was used as an oxygen storage component for the upstream catalyst 3.

Further, the results of Comparative Example show that an increase of the frequency of variations from 1 Hz to 2 Hz is advantageous to exhaust gas conversion. On the other hand, the degree of improvement in T50 of Example 2 (frequency: 2 Hz) over Example 1 (frequency: 1 Hz) is higher than that of 2 Hz over 1 Hz in Comparative Example.

It can be said that the above improvement in T50 of Example 2 was effected by the use of Rh—CeZrO having relatively good amount and rate of oxygen storage in the downstream catalyst 4 in Example 2. But, it is rather believed that the above improvement was more significantly effected by the fact that the oxygen storage component Rh—CeZrNdO in the upstream catalyst 3 has a high rate of oxygen storage. As a result of this, the values of C400 in Example 2 were increased to near 100%. Particularly considering that Example 2 has a higher space velocity than Example 1, it can be understood that Example 2 has an excellent catalyst composition.

In the present invention, one or more kinds of additional catalytic metals may be post-carried on each of the oxygen storage components in the upstream and downstream catalysts.

The present invention is not limited to the embodiment as described above but includes various changes and modifications without departing from the spirit and scope of the invention defined by the following claims.

What is claimed is:

1. An exhaust gas catalytic converter having an upstream catalyst and a downstream catalyst which are arranged in upstream and downstream sides of an engine exhaust passage through which exhaust gas flows, wherein
   each of the upstream catalyst and the downstream catalyst contains an oxygen storage component, wherein
   the oxygen storage component in the upstream catalyst has a structure in which Rh atoms are placed at or between crystal lattice points of a mixed oxide containing Ce and Zr and has a larger amount of oxygen storage than the oxygen storage component in the downstream catalyst under a same temperature conditions.

2. The exhaust gas catalytic converter of claim 1, wherein the oxygen storage component in the downstream catalyst has a structure in which Rh atoms are placed at or between crystal lattice points of a mixed oxide containing different ingredients from the oxygen storage component in the upstream catalyst, and the oxygen storage component in the upstream catalyst has a higher rate of oxygen storage than the oxygen storage component in the downstream catalyst under a same temperature conditions.

3. The exhaust gas catalytic converter of claim 2, wherein the oxygen storage component in the upstream catalyst has a structure in which Rh atoms are placed at or between crystal lattice points of a Ce——Zr——Nd ternary oxide, and the oxygen storage component in the downstream catalyst has a structure in which Rh atoms are placed at or between crystal lattice points of a Ce——Zr binary oxide.

4. An exhaust gas catalytic converter having an upstream catalyst and a downstream catalyst which are arranged in upstream and downstream sides of an engine exhaust passage through which exhaust gas flows, wherein the upstream catalyst comprises an inner catalytic layer disposed on a support and an outer catalytic layer disposed on the inner catalytic layer, and the outer catalytic layer contains an oxygen storage component in which Rh atoms are placed at or between crystal lattice points of a mixed oxide containing Ce, Zr and Nd.

5. The exhaust gas catalytic converter of claim 4, wherein the downstream catalyst contains at least one of an oxygen storage component in which Rh atoms are placed at or between crystal lattice points of a mixed oxide containing Ce and Zr and an oxygen storage component in which Rh particles are carried on a mixed oxide containing Ce and Zr.

6. The exhaust gas catalytic converter of claim 4 or 5, wherein the inner and outer catalytic layers of the upstream catalyst contain Pd and Pt, respectively.

* * * * *